March 30, 1965 P. E. E. A. A. HENRICOT 3,175,701
TRANSITION GEAR MECHANISM FOR USE WITH
AUTOMATIC RAILWAY COUPLER
Original Filed July 24, 1959 4 Sheets-Sheet 1

Inventor:-
Paul Emile Ernest Alfred Andre Henricot,
By Brown, Jackson, Boettcher & Dienner Attys.

March 30, 1965  P. E. E. A. A. HENRICOT  3,175,701
TRANSITION GEAR MECHANISM FOR USE WITH
AUTOMATIC RAILWAY COUPLER
Original Filed July 24, 1959  4 Sheets—Sheet 4
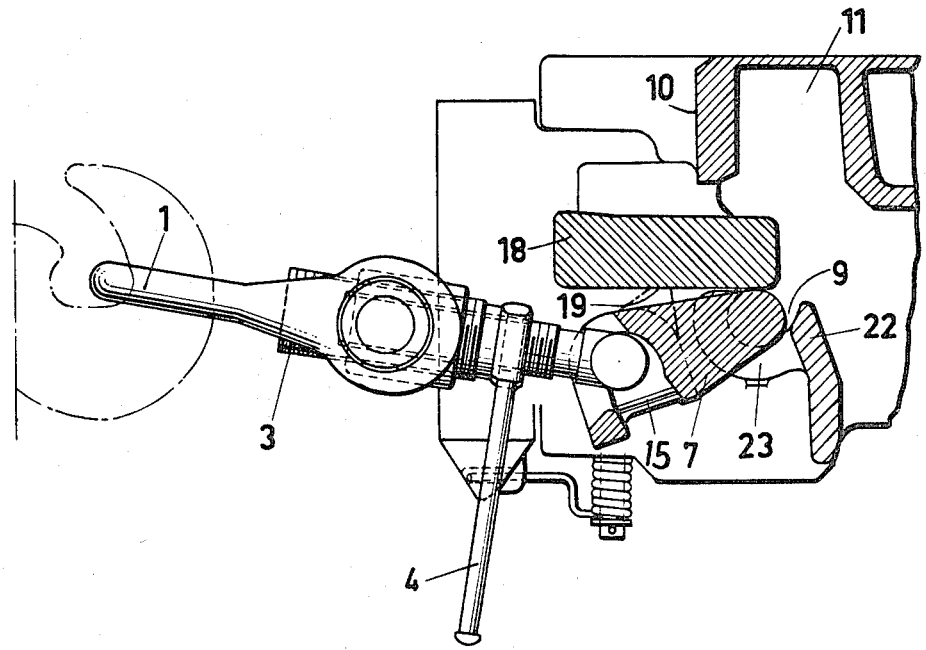
FIG.5.
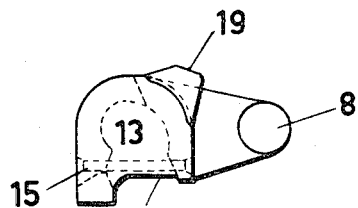
FIG.7.  FIG.6.
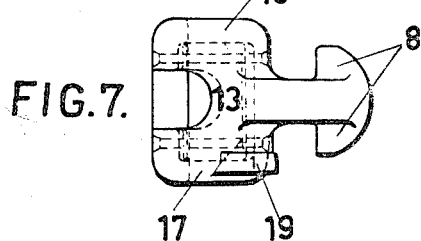
Inventor:
Paul Emile Ernest Alfred André Henricot,
By [signature] Atty's.

United States Patent Office 3,175,701
Patented Mar. 30, 1965

3,175,701
TRANSITION GEAR MECHANISM FOR USE WITH AUTOMATIC RAILWAY COUPLER
Paul Emile Ernest Alfred André Henricot, 8 Rue de la Motte, Ceroux-Mousty, Court-St.-Etienne, Belgium
Original application July 24, 1959, Ser. No. 829,266, now Patent No. 3,097,751, dated July 16, 1963. Divided and this application June 3, 1963, Ser. No. 284,900
Claims priority, application Great Britain, Aug. 14, 1958, 26,206/58
5 Claims. (Cl. 213—112)

This application is a division of my copending application Serial No. 829,266, filed July 24, 1959, now United States Patent 3,097,751.

The present invention is for use with railway cars which are equipped with automatic couplers of the movable knuckle type. The invention relates to a transition gear mechanism which is associated with an automatic coupler and is adapted to be utilized in place thereof where it is desired to couple a railway car thus equipped with another car which is equipped only with a hook and screw type coupling.

It is known that substantially all new railway cars are equipped with automatic couplers of the movable knuckle type, but for reasons of economy it is desirable to avoid the necessity of immediately equipping all of the older railway cars still in use with such modern equipment. Since it is obviously necessary that some means be provided for coupling the new vehicles with the older ones having the so-called hook and screw couplers, it is believed that the optimum and most economical solution is to equip the new vehicles not only with automatic couplers but also with a transition gear mechanism which will permit a new vehicle to be coupled to an older one having a hook and screw coupler. Such a procedure eliminates the need for immediate replacement of the old equipment so that the ultimate objective of providing all railway cars in use with modern coupling equipment can be spread out over a reasonable period of time.

Various types of transition gear mechanisms have heretofore been proposed, but certain disadvantages have been inherent in such known mechanisms which have limited their acceptability. Thus, it is common to connect a transition coupler to an automatic coupler head by means of a large bolt which passes through the cheeks of a slot provided in the impact face of the automatic coupler casting. However, such a procedure will tend to weaken the coupler casting, and will cause the lock of the automatic coupler knuckle to be shifted laterally, whereby when the coupler is in service the internal transmission of forces to the rear shank will follow a very intricate path.

Furthermore, transition gear mechanisms of the type heretofore known generally comprise a simple screw member which is difficult to insert in the link between the automatic coupler head and the hook due to the short distance which is left between these members when lateral buffers of mating vehicles are in contact. It is common to attempt to overcome this problem by providing a deep slot in the automatic coupler head, but such an expedient will weaken the coupler head and render it less resistant to deformation and failure.

It is an object of the present invention to provide a transition coupler which overcomes the foregoing disadvantages of known devices and which effects improved operation and greater durability.

A further object of the invention is to provide a transition coupler as last mentioned above which may be associated with the head of an automatic coupler without significantly weakening the latter, whereby both the transition coupler and the automatic coupler will be fully able to withstand maximum loads without undesirable deformation.

Still another object of the invention is to provide a transition coupler embodying a telescopic screw mechanism which substantially increases the range of lengthwise adjustability.

Now in order to acquaint those skilled in the art with the manner of utilizing and practicing my invention, I shall describe, in conjunction with the accompanying drawings, certain preferred embodiments of my invention.

In the drawings:

FIGURE 5 is a view similar to FIGURE 4 with the automatic coupler shown sectioned along the line V—V of FIGURE 2 so as to illustrate the manner in which a knuckle tail of the automatic coupler mechanism is shaped so as to pass over the recess which is provided in the automatic coupler head to house the end of the transition coupler;

FIGURE 6 is a detail side elevational view of a gear carrier which comprises one component of the transition gear mechanism; and FIGURE 7 is a top plan view of the gear carrier of FIGURE 6.

Figure 2:
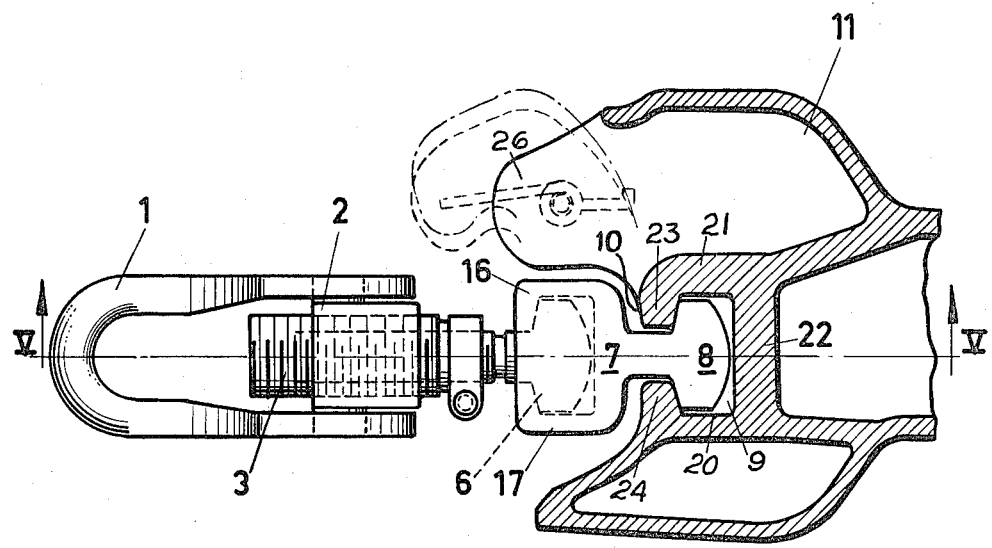
FIGURE 2 is a top plan view, partly in section, showing the transition coupler mounted in an automatic coupler head, the transition coupler being shown in its substantially fully shortened position.
Figure 1:
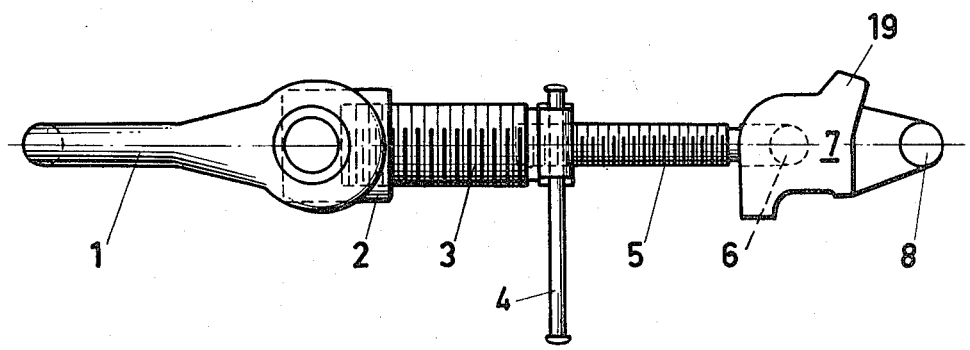
FIGURE 1 is a side elevational view of a screw and shackle transition coupler constructed in accordance with the present invention and including a carrier at the right end thereof to permit mounting said coupler in the head of an automatic coupler device to be associated therewith, the transition coupler being shown in its fully elongated position.

Referring now to the drawings, FIGURES 1 and 2 show a transition coupler comprising a shackle 1 and a swivel nut 2 which is pivotally mounted between the legs of the shackle and which is internally threaded so as to receive therein a hollow tube 3 which is threaded both externally and internally. One end of the tube 3 has affixed thereto a collar which carries a handle 4 adapted to permit manual rotation of the tube. A solid screw 5 is threaded into the end of the tube 3, and the rear or right hand end of the screw 5 as shown in FIGURE 2 is provided with a double trunnion 6 for mounting the same.

A gear carrier 7 has a recess or cavity formed in one end thereof for accommodating the double trunnion 6, and the opposite end of the carrier is provided with a double trunnion 8 which is adapted to be mounted in a cavity 9 which is formed within the bottom portion of a striking face 10 of an automatic coupler head 11. It will be understood that the trunnion mounting 6 permits pivotal movement of the screw 5 and the members mounted thereon in a vertical plane, and that the gear carrier 7 is itself movable angularly in a similar manner due to the trunnion mounting 8.

The present transition coupler facilitates hitching and also shortening of headstock distances as required in traffic, because the two ends thereof are attached in proximity to the headstocks of vehicles to be coupled together. However, when an automatic coupler is provided on one of the vehicles to be coupled, the dormant part of the shackle cannot be fixed as far back as the permanent articulation at the rear of the hook since this would require removal of the bottom half of the coupler casting.

It is important to understand that a vehicle which is intended to be coupled with a car equipped with a hook type of coupler should be provided with side buffers, since hook-equipped stock is designed to receive buffing stresses on a pair buffers and not at the center of the headstock. Such side buffers will maintain adjacent vehicles far enough apart to prevent any interference between an automatic coupler knuckle on one car and a hook on the other, and the transition gear of the present invention will provide sufficient length so that the end shackle of the transition gear on one car can be hitched manually over the hook provided on the other car, after which the transition gear can be shortened in order to produce the required precompression of the side buffers.

With regard to the shortening of the transition gear, FIGURE 1 shows the gear in its elongated position and FIGURE 2 shows the gear in its shortened position. It will be seen that by rotating the handle 4 the consequent rotation of the tube 3 will cause the tube to be threaded into the nut 2 so as to project therebeyond, and will cause the screw 5 to be drawn into the tube in telescoping relation therewith. Accordingly, if the tube 3 be considered as drawing together the nut 2 and the screw 5, it will be understood that it draws such components together beyond a abutting relation, since in fact they are adapted to be telescoped one within the other so that to substantially increase the range of permissible adjustment.

Another feature of the structure described herein and illustrated in FIGURES 2-5 is that the transition gear is so mounted and constructed as to minimize lateral sway in curves and thereby avoid interference between the knuckle or other components of the automatic coupler and the components of the transition gear. In addition, the transition gear is associated with the automatic coupler head as not to reduce the strength of the latter any more than absolutely necessary, while yet permitting the transition gear to be moored sufficiently out of the way as to provide ample space for operation of the automatic coupler.

Figure 3:
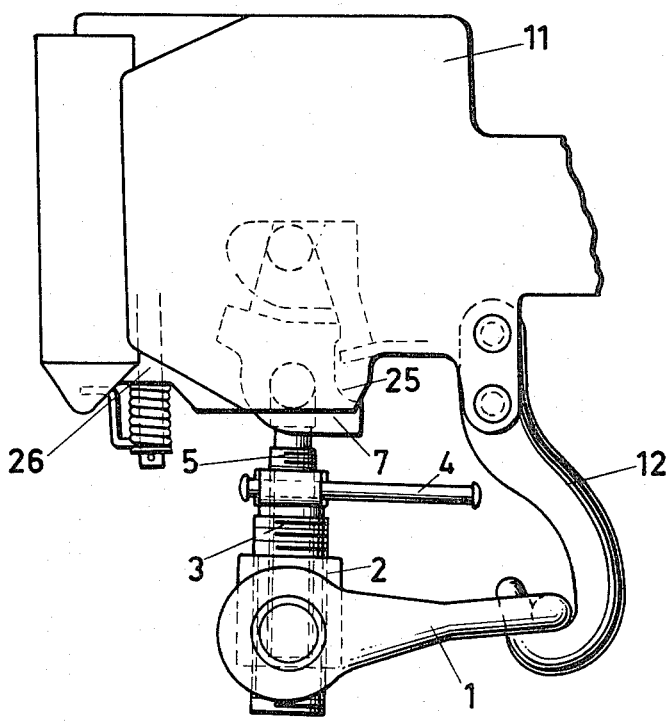
FIGURE 3 is a side elevational view illustrating the manner in which the screw and shackle transition coupler is positioned out of the way when not in use.

One of the most important features of the transition gear of the present invention is the provision of the pair of double trunnion mountings 6 and 8. These trunnion mountings offer broad flexibility of movement in a vertical plane as is required during general use of the transition gear, and in conjunction with the permissible pivotal movement of the nut 2 they permit the gear to be safely hitched to a hook 12 as shown in FIGURE 3 in order to provide the space required for operation of the associated automatic coupler. In addition, the double trunnion mountings 6 and 8 provide for a slight transverse mobility due to the fact that the forward bearing faces on the trunnions 6 and 8 which are loaded during traction are arcuate in their contour as shown in FIGURE 2, and also because a small amount of lateral play is permitted between the trunnion ends and the side walls of the cavities in which they are housed. The trunnion ends are also relieved to provide maximum elastic resistance to dynamic stresses.

Referring now to the pockets or cavities which are provided to receive the trunnion members 6 and 8, the first pocket is provided in the box-like portion 13 of the gear carrier 7 in order to receive the trunnions 6 formed on the end of the screw 5. The trunnions are introduced into the carrier through a slot provided on face 14 thereof, the form of which is such that when the screw is tightened or positioned as in FIGURE 2 the trunnions are prevented from leaving their seats. A pair of rivets 15 serve to close the gap and prevent the trunnions from leaving the pocket when the screw coupler is loosed or the side buffers are compressed. A pair of continuous side walls 16 and 17 of the box-like gear carrier member are adapted to transmit the tensile or tractive forces to which the transition gear is subjected.

Figure 4:
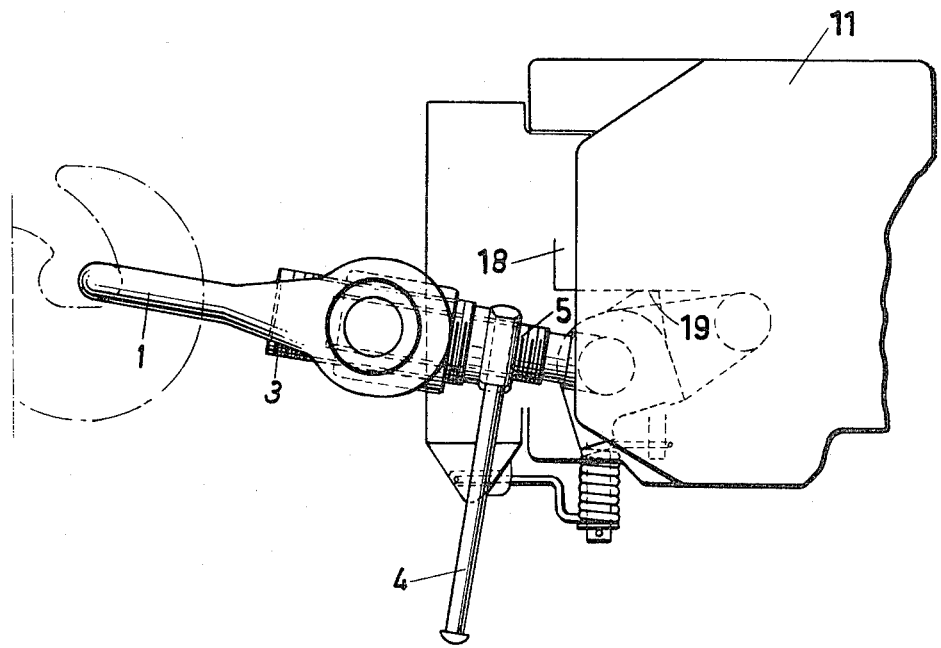
FIGURE 4 is a view similar to FIGURE 3 but illustrating the transition coupler in an operative position wherein it is associated with the hook of a vehicle equipped with a hook and screw type coupler.

As previously described, the opposite end of the gear carrier 7 is provided with the double trunnions 8 which are similar in structure to the trunnions 6. The gear carrier is further provided with a bearing surface 19 which is adapted to abut the bottom of the knuckle tail 18 of the automatic coupler mechanism so as to limit the upward pivotal movement of the carrier 7, as best shown in FIGURES 4 and 5. Such an arrangement will prevent the screw 5 of the transition gear from interfering with the knuckle tail 18, and it will also prevent accidental closure of the knuckle.

The cavity or pocket 9 which is formed in the automatic coupler head 11 is best shown in FIGURES 2 and 4, and it will be seen that a pair of continuous side walls 20 and 21 not only withstand the tensile or tractive forces applied to the transition coupler but they also support the striking face 10 of the coupler head. The side walls 20 and 21 take a firm seating on a back face 22 which is of substantial thickness, and in addition such walls are braced by a pair of ledges 23 and 24 which curve in hook-like fashion around the double trunnion 8. The overall arrangement thus provides a box-like columnar block strongly strutted rearwardly in order to compensate for the removed portion of the bottom striking face 10, which portion must of course be removed to accommodate the transition gear.

The gear carrier 7 is hooked in the pocket 9 of the automatic coupler head 11 before introducing the other parts of the operating mechanism, so that it is possible to insert the double trunnion 8 in the seats formed by the walls 20 and 21. The arrangement is such that some portion of the knuckle tail 18 will always be disposed to prevent the double trunnion 8 from being removed from its seats. The gear carrier 7 has also been cut away as shown at 25 in order to permit continuing as far as possible the bottom wall of the coupler box casting 11 by which the wing 21 is joined to the shank.

The double trunnion 8 is vertically disposed as near as possible to the horizontal plane of the automatic coupler so that in service the axis of the transition coupler will be approximately in alignment with the horizontal axis of the automatic coupler.

It will be seen that due to the features of the present invention an automatic coupler may be adapted to receive a transition screw coupler of normal strength which is well suited for coupling with railway cars equipped with the earlier form of hook and screw coupling means. Moreover, the automatic coupler is not weakened by the use of the transition gear so that at such time as the transition gear is no longer needed and is thus removed the automatic coupler will be adapted to function along and withstand maximum loads without undesirable deformation or failure.

While I have illustrated my invention in a preferred form I do not intend to be limited to that form, except insofar as the appended claims are so limited, since modifications coming within the scope of my invention will be readily suggested to others with my disclosure before them.

I claim:

1. A transition gear mechanism for use in conjunction with a railway car automatic coupler comprising a shackle designed to be hooked over a component of an adjacent car and having a hollow part internally and externally threaded in reverse direction, said part engaging by its external thread a nut journalled in said shackle at one end and its internal thread being able to engage at the other end a screw terminated in the direction opposite to said hollow part by a double trunnion shaped to be inserted in a box-like pocket provided at one end of a transition gear carrier, said pocket having a slot on one of its side walls to permit entry of said double trunnion, the latter being prevented from leaving said pocket by a pair of overlapping side-walls and by rivet means which is driven in the path of said double trunnion after entering the pocket, said gear carrier being provided at the other end with a double trunnion similar to said first-mentioned trunnion.

2. A transition gear mechanism for use in conjunction with a railway car automatic coupler comprising, in combination, a coupler casting for connection with a car structure through a compressible draft gear or the like, transition gear means including a shackle adapted to be hitched over a component of an adjacent car, a threaded nut journalled in said shackle, a hollow tube threaded in said nut, said tube being internally threaded in reverse direction to the threading of said nut, a screw threaded in said tube, said screw having a first double trunnion at one end, a transition gear carrier adapted to receive said first double trunnion and having thereon a second double trunnion for connection with said coupler casting, a buffing face wall on said coupler casting, and a recess in the bottom portion of said buffing face wall, said second double trunnion being positioned in said recess and retained therein.

3. A transition gear mechanism of the type set forth in claim 2 in combination with an automatic coupling mechanism wherein a knuckle is rotatably mounted on a pivot pin on said coupler casting and disposed in open inoperative position so as to prevent by a tail portion thereon said double trunnion of said gear carrier from escaping from said recess.

4. A gear mechanism of the type set forth in claim 3 wherein said recess in said buffing face wall is defined by a pair of spaced-apart vertical longitudinal side walls, and a pair of ledges integral with the front of said side walls and extending toward one another so as to partially hook over said gear carrier double trunnion, said ledges serving to reinforce said side walls and to retain said double trunnion within said recess.

5. A gear mechanism of the type set forth in claim 3 wherein said recess in said buffing face wall is defined by a pair of spaced-apart vertical longitudinal side-walls, a back face integral with the rear of said side-walls, and a pair of ledges integral with the front of side-walls and extending toward one another so as to be adapted to partially hook over said gear carrier double trunnion disposed within said recess, said ledges serving to reinforce said side-walls and to retain said double trunnion within said recess.

References Cited in the file of this patent

UNITED STATES PATENTS

| | | |
|---|---|---|
| 1,614,514 | Willison et al. | Jan. 18, 1927 |

FOREIGN PATENTS

| | | |
|---|---|---|
| 247,474 | Great Britain | Feb. 18, 1926 |
| 610,972 | Canada | Dec. 20, 1960 |
| 636,561 | Canada | Feb. 13, 1962 |
| 611,582 | France | Feb. 22, 1926 |
| 233,632 | Australia | Aug. 6, 1959 |
| 359,737 | Switzerland | Aug. 11, 1959 |